US009185779B2

(12) United States Patent
Murakami et al.

(10) Patent No.: US 9,185,779 B2
(45) Date of Patent: Nov. 10, 2015

(54) SENSOR DEVICE FOR REDUCING ERRONEOUS ACTIVATION OF A LIGHT SOURCE

(71) Applicant: PANASONIC CORPORATION, Osaka (JP)

(72) Inventors: Tadashi Murakami, Osaka (JP); Shigeo Gotoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 294 days.

(21) Appl. No.: 13/890,384

(22) Filed: May 9, 2013

(65) Prior Publication Data

US 2013/0320865 A1    Dec. 5, 2013

(30) Foreign Application Priority Data

Jun. 1, 2012 (JP) ................. 2012-126328

(51) Int. Cl.
| | |
|---|---|
| *H05B 37/02* | (2006.01) |
| *H05B 39/04* | (2006.01) |
| *F21V 23/04* | (2006.01) |
| *G01S 13/56* | (2006.01) |

(52) U.S. Cl.
CPC ........ *H05B 37/0227* (2013.01); *F21V 23/0471* (2013.01); *G01S 13/56* (2013.01); *Y02B 20/44* (2013.01)

(58) Field of Classification Search
CPC . H05B 37/0227; F21V 23/0471; G01S 13/56; Y02B 20/44
USPC ........ 315/152, 154, 155; 250/338.1; 340/554, 340/555
See application file for complete search history.

(56) References Cited

U.S. PATENT DOCUMENTS

| | | | |
|---|---|---|---|
| 4,012,730 A | 3/1977 | Nicholls | |
| 4,090,195 A | 5/1978 | Guennou et al. | |
| 4,943,712 A | * | 7/1990 | Wilder .......................... 250/221 |

(Continued)

FOREIGN PATENT DOCUMENTS

| | | |
|---|---|---|
| CN | 2088771 U | 11/1991 |
| EP | 2280289 | 2/2011 |

(Continued)

OTHER PUBLICATIONS

Chinese Office Action for corresponding Chinese Application No. 201310206962.8, dated Jan. 7, 2015 (with English translation).

(Continued)

*Primary Examiner* — Kenneth B Wells
(74) *Attorney, Agent, or Firm* — Renner, Otto, Boisselle & Sklar, LLP

(57) ABSTRACT

A sensor device includes a sensor that transmits radio waves of a predetermined frequency and receives reflected waves of the transmitted radio waves. The sensor device detects presence of a moving body based on a difference between a frequency of the transmitted radio waves and a frequency of the reflected waves to activate a light source in accordance with the detection. A processor generates a sensor signal indicating the detection of the sensor. A determination unit determines whether or not the sensor signal has an intensity that is greater than a predetermined threshold. A controller controls activation of the light source when determined that the intensity of the signal is greater than the threshold. The controller restricts activation of the light source when determined that the intensity of the sensor signal is greater than the threshold until a first specified time elapses from the determination.

6 Claims, 6 Drawing Sheets

(56) References Cited

U.S. PATENT DOCUMENTS

| | | | |
|---|---|---|---|
| 5,489,891 A * | 2/1996 | Diong et al. | 340/567 |
| 6,069,561 A * | 5/2000 | Schopf et al. | 340/554 |
| 6,791,458 B2 * | 9/2004 | Baldwin | 340/522 |
| 8,232,909 B2 * | 7/2012 | Kroeger et al. | 342/28 |
| 8,947,000 B2 * | 2/2015 | Chen | 315/159 |
| 2010/0295479 A1 | 11/2010 | Sobagaki et al. | |

FOREIGN PATENT DOCUMENTS

| | | |
|---|---|---|
| JP | 60-027949 B2 | 7/1985 |
| JP | 01-289094 A | 11/1989 |
| JP | 06-074504 A | 3/1994 |
| JP | 2009-129775 A | 6/2009 |
| JP | 4558629 B2 | 7/2010 |
| JP | 2011-047779 A | 3/2011 |
| JP | 2011-124187 A | 6/2011 |
| JP | 2012-047493 A | 3/2012 |

OTHER PUBLICATIONS

European Search Report for corresponding European Application No. 13002582.8, dated Aug. 30, 2013.

European Search Report for corresponding Application No. 13002582.8, dated Aug. 30, 2013.

* cited by examiner

Fig.10

| 1st Signal Intensity | 2nd Signal Intensity (Opposite Side of 1st Signal Intensity) | Masking Time Total | Breakdown 1st | Breakdown 2nd |
|---|---|---|---|---|
| Vth<x<Vth2 | - | t5 | t5 | - |
| Vth2<x<Vth3 | - | t3 | t3 | - |
| Vth3<x | - | t6 | t6 | - |
| Vth<x<Vth2 | Vth<x<Vth2 | t3 | t5 | t5 |
| Vth2<x<Vth3 | Vth<x<Vth2 | t6 | t3 | t5 |
| Vth3<x | Vth<x<Vth2 | t7 | t6 | t5 |
| Vth<x<Vth2 | Vth2<x<Vth3 | t6 | t5 | t3 |
| Vth2<x<Vth3 | Vth2<x<Vth3 | t7 | t3 | t3 |
| Vth3<x | Vth2<x<Vth3 | t8 | t6 | t3 |
| Vth<x<Vth2 | Vth3<x | t7 | t5 | t6 |
| Vth2<x<Vth3 | Vth3<x | t8 | t3 | t6 |
| Vth3<x | Vth3<x | t9 | t6 | t6 |

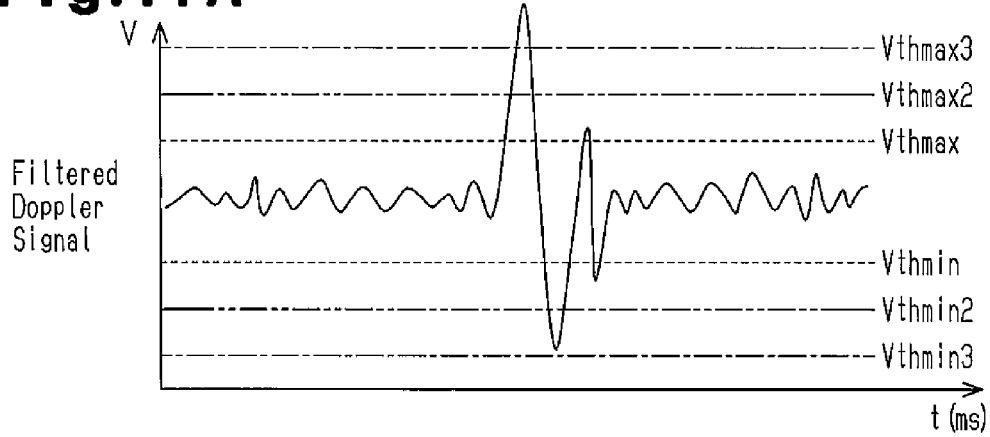

Fig.11B

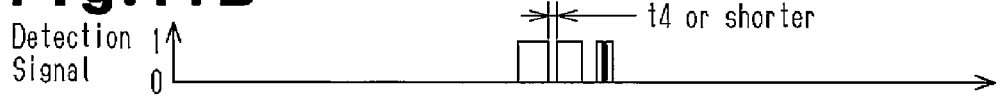

Fig.11C

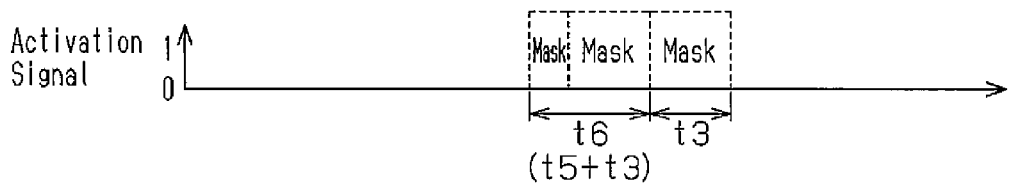

ately determines that a moving body is present in the detection area, and thereby, erroneously activate a light source. In particular, when two lighting devices are in an opposing arrangement, sensors of the two lighting devices may be activated at the same time. In such a case, a difference in the oscillation frequency of the radio waves transmitted from the sensor of one lighting device and the oscillation frequency of the radio waves transmitted from the sensor of the other lighting device may be detected as a Doppler frequency shift.

US 9,185,779 B2

SENSOR DEVICE FOR REDUCING ERRONEOUS ACTIVATION OF A LIGHT SOURCE

CROSS-REFERENCE TO RELATED APPLICATIONS

This application is based upon and claims the benefit of priority from prior Japanese Patent Application No. 2012-126328, filed on Jun. 1, 2012, the entire contents of which are incorporated herein by reference.

BACKGROUND OF THE ART

The present invention relates to a sensor device including a sensor that transmits radio waves at a predetermined frequency and receives reflected waves of the radio waves, detects a moving body based on a difference of the frequency of the radio waves and the frequency of the reflected waves to activate a light source.

Japanese Laid-Open Patent Publication No. 2001-124187 describes an example of a lighting device that uses a sensor to detect the presence of a human body in a detection area and activates or deactivates a light source in accordance with the detection. One such sensor is an active type sensor that transmits detection waves, such as electromagnetic waves, and receives the detection waves reflected by an object to detect the presence of a moving body in a detection area.

When two lighting devices are arranged opposing each other, the sensor of one lighting device transmits radio waves having an oscillation frequency that differs greatly from that of the radio waves transmitted from the sensor of the other lighting device. This reduces the interference of the radio waves from the sensors.

In an active type sensor, light sources proximal to the sensor may interfere with the radio waves. In such a case, even though a moving body is not present in the detection area, the active type sensor may determine that a moving body is present in the detection area, and thereby, erroneously activate a light source. In particular, when two lighting devices are in an opposing arrangement, sensors of the two lighting devices may be activated at the same time. In such a case, a difference in the oscillation frequency of the radio waves transmitted from the sensor of one lighting device and the oscillation frequency of the radio waves transmitted from the sensor of the other lighting device may be detected as a Doppler frequency shift.

SUMMARY OF THE INVENTION

One aspect of the present invention is a sensor device including a sensor that transmits radio waves of a predetermined frequency and receives reflected waves of the transmitted radio waves. The sensor device detects presence of a moving body based on a difference between a frequency of the transmitted radio waves and a frequency of the reflected waves to activate a light source in accordance with the detection. A processor generates a sensor signal indicating the detection of the sensor. A determination unit determines whether or not the sensor signal has an intensity that is greater than a predetermined threshold. A controller controls activation of the light source when it is determined that the intensity of the sensor signal is greater than the threshold. The controller restricts activation of the light source when it is determined that the intensity of the sensor signal is greater than the threshold until a first specified time elapses from the determination.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 10 is a table for a lighting device of a fourth embodiment showing the masking time set in accordance with the signal intensity of a Doppler signal; and FIGS. 11A to 11C are timing charts for the lighting device of the fourth embodiment showing conditions under which a masking time is changed in accordance with the signal intensity of a Doppler signal.

DETAILED DESCRIPTION OF THE INVENTION

A lighting device 10 according to a first embodiment of the present invention will now be described with reference to FIGS. 1 to 4.

The lighting device 10 of the present embodiment includes an active type radio wave sensor.

Figure 1:
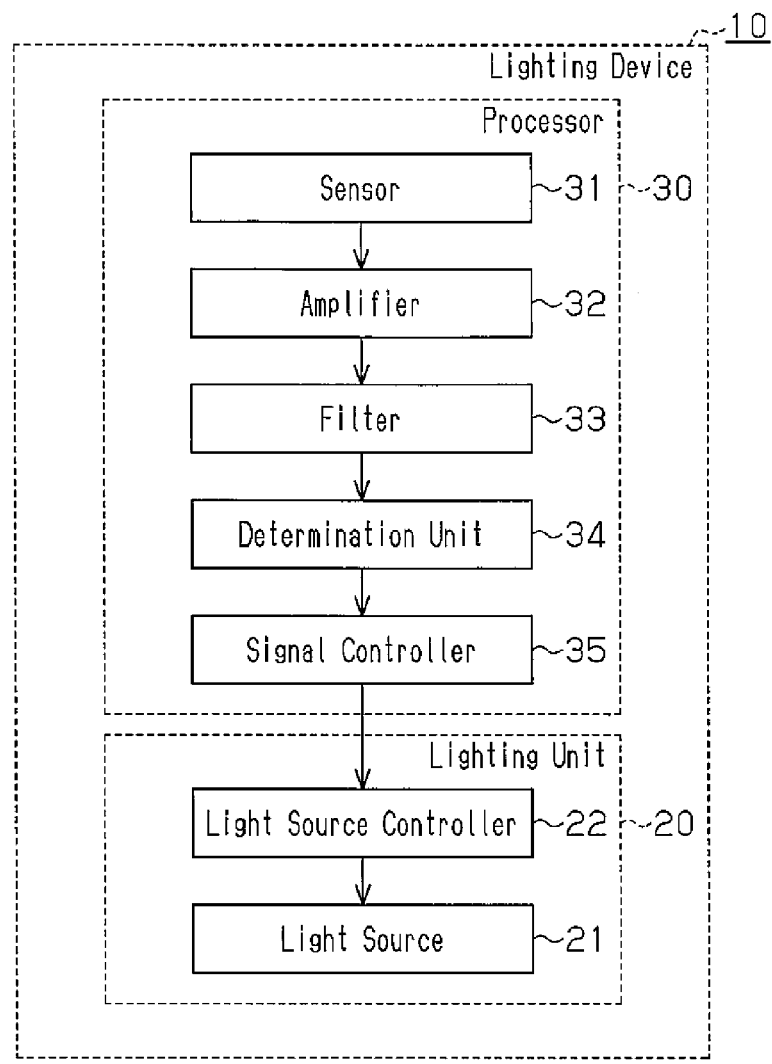
FIG. 1 is a schematic block diagram illustrating the structure of a lighting device in a first embodiment.

Referring to FIG. 1, the lighting device 10 includes a lighting unit 20, which emits light to a predetermined emission region, and a processor 30, which detects the presence of a moving body in a predetermined detection area.

The lighting unit 20 includes a light source 21, which emits light, and a light source controller 22, which controls the activation and deactivation of the light source 21 based on an activation signal from the processor 30. Upon receipt of an activation signal from the processor 30, the light source controller 22 activates the light source 21 over an activation time (ten seconds in the first embodiment). Afterward, when an activation signal is no longer received from the processor 30, the light source controller 22 deactivates the light source 21.

The processor 30 includes a sensor 31, which generates a Doppler signal (sensor signal), and an amplifier 32, which amplifies the Doppler signal from the sensor 31. The processor 30 also includes a filter 33 that attenuates a Doppler signal other than a specific frequency band (in the first embodiment, 0 to 500 Hz). Further, the processor 30 includes a determination unit 34, which performs a determination with a Doppler signal attenuated by the filter 33, and a signal controller 35, which generates an activation signal based on the determination of the determination unit 34 and provides the light source controller 22 with the activation signal. The lighting unit 20 and the processor 30 are electrically connected.

The sensor 31 may be an active type radio wave Doppler sensor that transmits radio waves of a predetermined frequency (in the first embodiment, millimeter waves of 24 GHz). When an object reflects transmitted radio waves, the sensor 31 receives the reflected radio waves (received waves). Then, the sensor 31 provides the amplifier 32 with a Doppler signal that indicates the difference between the frequency of the transmitted radio waves and the frequency of the reflected waves. In the first embodiment, the moving body may include a human body.

The filter 33 attenuates a Doppler signal other than the specific frequency band and provides the determination unit 34 with the Doppler signal that is in the specific frequency band. To eliminate noise when flashing the light source 21, the filter 33 includes a band-pass filter corresponding to a frequency band that is N times greater than the power supply frequency.

The determination unit 34 performs a digital-analog conversion with the amplitude value of the Doppler signal attenuated by the filter 33 to generate amplification data. The determination unit 34 compares the amplification data and a predetermined threshold to determine whether the amplification data exceeds the threshold. The threshold is used to determine whether or not a moving body is present in the detection area. When the signal intensity corresponding to the amplification data exceeds a threshold, the determination unit 34 provides the signal controller 35 with a detection signal indicating that the signal intensity exceeds the threshold. On the other hand, when the signal intensity corresponding to the amplification data does not exceed the threshold, the determination unit 34 does not provide the signal controller 35 with a detection signal of a moving body.

When receiving a detection signal from the determination unit 34, the signal controller 35 provides the light source controller 22 with an activation signal only if an output condition for providing the activation signal is satisfied. That is, the signal controller 35 does not provide the light source controller 22 with an activation signal when the output condition is not satisfied even when the detection signal is received.

An example of control executed by the lighting device 10 of the first embodiment will now be discussed with reference to FIGS. 2 and 3. In FIGS. 3A and 3B, the horizontal axis represents time (ms), and the vertical axis represents voltage (V). In FIGS. 3C and 3D, the horizontal axis represents time (ms), and the vertical axis shows the generation of commands. More specifically, the logic value of "1" indicates the generation of a command, and the logic value of "0" indicates that a command has not been generated.

When the lighting device 10 is supplied with AC power, the sensor 31 transmits radio waves toward a detection area and receives reflected waves reflected by a moving body in the detection area. The sensor 31 provides the amplifier 32 with a Doppler signal that indicates the difference between the frequency of the transmitted radio waves and the frequency of the received waves. The light source 21 is activated when the signal intensity of the Doppler signal exceeds the threshold and the signal controller 35 generates an activation signal.

FIG. 3A shows a Doppler signal amplified by the amplifier 32 subsequent to the activation of the light source 21. The activation of the light source 21 may be unstable at timing P1, which is when the light source 21 is activated, and at timing P2, which is within a period from when the light source 21 is activated to when the activated light source 21 is stabilized. The activation of the light source 21 also becomes unstable when the light source 21 is deactivated from a stably activated state. Referring to FIG. 3A, spike noise that occurs when the activation of the light source 21 is unstable results in the sensor 31 generating the Doppler signal with a large amplitude.

The time from when the lighting device 10 is supplied with AC power to when timing P1 is reached is set to be longer than or equal to a specified time (activation time) t1 (in the first embodiment, 250 ms). The specified time t1 is the minimum time required for the light source 21 to activate after the lighting device 10 is supplied with power. When a moving body is present in the detection area of the sensor 31, the sensor 31 generates the Doppler signal after timing P2 with peaks in intervals shorter than the specified time.

When the filter 33 receives the Doppler signal, the filter 33 attenuates the Doppler signal other than the specific frequency band. FIG. 3B shows the waveform of the Doppler signal attenuated by the filter 33. The determination unit 34 compares the Doppler signal attenuated by the filter 33 with thresholds. Here, the determination unit 34 sets a tolerable range between thresholds, namely, a maximum value Vthmax to a minimum value Vthmin.

Referring to FIG. 3B, at timing P1, the Doppler signal exceeds the maximum value Vthmax. At timing P2, the Doppler signal is outside the tolerable range from the maximum value Vthmax to the minimum value Vthmin. The signal intensity of a Doppler signal including spike noise is great enough to exceed the threshold.

The sensor 31 may detect spike noise occurring in a light source 21 that is arranged proximal to the sensor 31.

Referring to FIG. 3C, when determining that the signal intensity of the Doppler signal has exceeded the threshold, the determination unit 34 generates a detection signal. The determination unit 34 does not generate a detection signal when the signal intensity of the Doppler signal is in the tolerable range. Accordingly, spike noise may lead to the generation of a detection signal that activates the light source 21.

Figure 2:
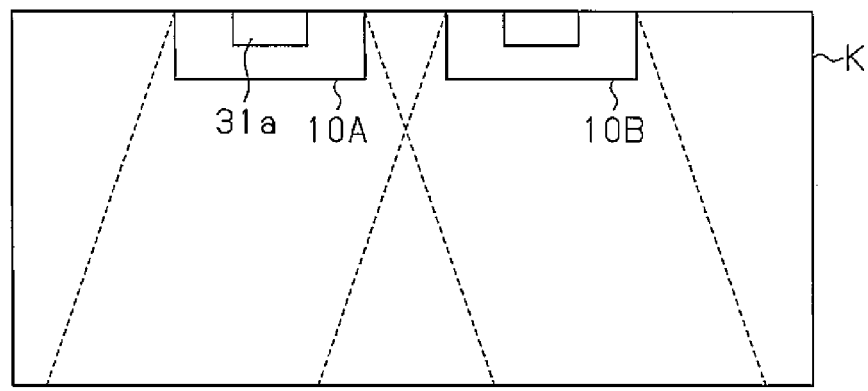
FIG. 2 is a schematic block diagram illustrating a layout example of lighting devices in the first embodiment.
Figure 3A:
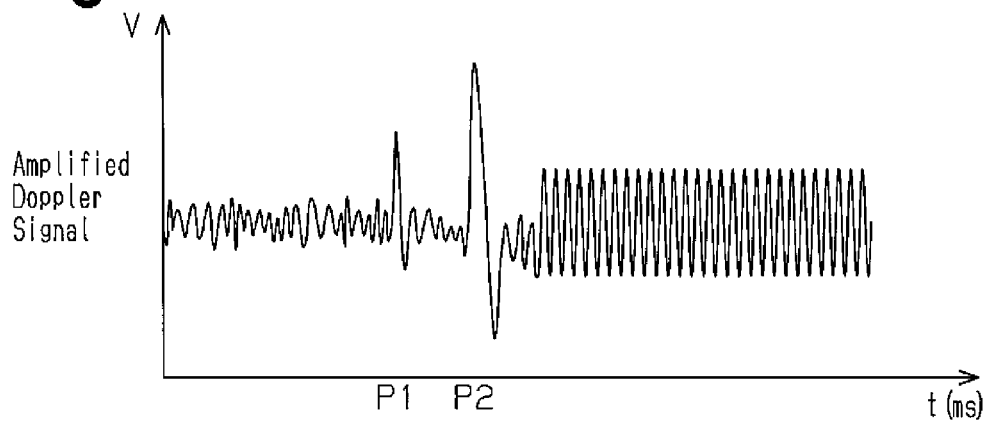
FIG. 3A is a timing chart of a Doppler signal amplified by an amplifier.
Figure 3B:
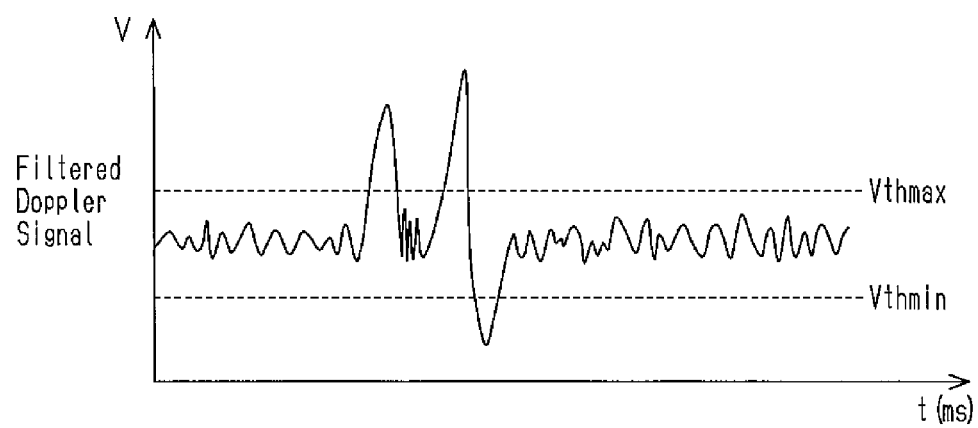
FIG. 3B is a timing chart of a Doppler signal attenuated by a filter.
Figure 3C:
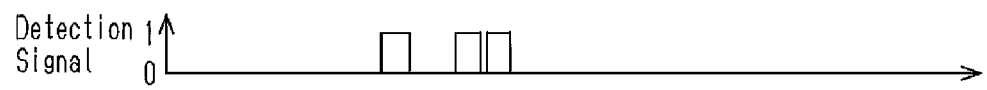
FIG. 3C is a timing chart of a detection signal.
Figure 3D:
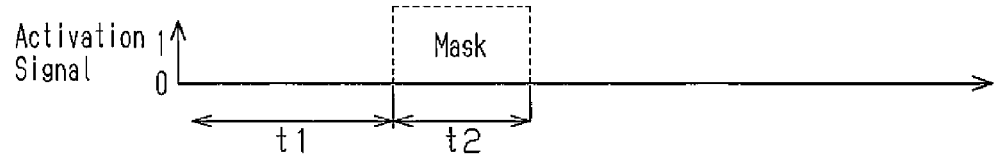
FIG. 3D is a timing chart of an activation signal.

More specifically, referring to FIG. 2, lighting devices 10A and 10B may be arranged so that detection areas of the lighting devices 10A and 10B are partially overlapped inside a room K. When a moving body is present in the detection area of the lighting device 10B but not in the detection area of the lighting device 10A, the light source 21 of the lighting device 10B is activated. The activation of the light source 21 may produce spike noise in the lighting device 10B at timing P1 and timing P2. In this case, even though a moving body is not present in the detection area of the lighting device 10A, when the sensor of the lighting device 10A detects the spike noise of the lighting device 10B, the light source 21 of the lighting device 10A may be erroneously activated.

To cope with such a situation, in the lighting device 10 of the present embodiment, when the determination unit 34 determines that the signal intensity of a Doppler signal exceeds the threshold, the activation control of the light source 21 is restricted by a specified time (stabilization time) t2 (in the present embodiment, 200 ms). The specified time t2 is set to be longer than the period from timing P1 to timing P2. In the present embodiment, the restriction of the activation control refers to restriction of further activation of the light source 21 based on a new activation signal regardless of whether or not the light source 21 is activated. More specifically, the restriction of activation control restricts activation of the light source 21. When the light source 21 is activated, the restriction of activation control starts a new measurement of the activation time.

When the determination unit 34 determines that the signal intensity of the Doppler signal exceeds a threshold, the determination unit 34 provides a detection signal to the signal controller 35. The signal controller 35 masks the detection signal from immediately after the detection signal rises to when the specified time t2 elapses. When performing masking, the signal controller 35 ignores the detection signal even when receiving the detection signal from the determination unit 34. As a result, the signal controller 35 does not provide the light source controller 22 with an activation signal. Since an activation signal is not received, the light source controller 22 keeps the light source 21 deactivated.

The masking procedures will now be described.

At timing P1, the intensity of the Doppler signal exceeds the maximum value Vthmax. Thus, as shown in FIG. 3C, a detection signal is generated for the first time at timing P1. In the same manner, at timing P2, the intensity of the Doppler signal is outside the range between the maximum value Vthmax and the minimum value Vthmin. Thus, as shown in FIG. 3C, a detection signal is generated for the second time at timing P2.

The signal controller 35 measures the elapsed time from immediately after when the lighting device 10 is supplied with AC power. After the lighting device 10 is supplied with power, when the signal controller 35 receives a detection signal for the first time, the signal controller 35 determines whether or not the elapsed time from when lighting device 10 is supplied with power is greater than or equal to the specified time t1.

When determining that the elapsed time is greater than or equal to the specified time t1, the signal controller 35 performs masking from immediately after the rising (input) of the first detection signal to when the specified time t2 elapses. In the description hereafter, the period during which masking is performed is referred to as the masking time. When performing masking, the signal controller 35 does not generate an activation signal even when receiving a detection signal during the masking period.

As described above, the specified time t2 is set to be longer than the period from timing P1 to timing P2. Thus, as shown in FIGS. 3C and 3D, even when a detection signal is generated due to spike noise at the two timings P1 and P2, the masking stops the generation of activation signals. As a result, the lighting device 10 is not erroneously activated when the light source 21 of the lighting device 10 produces spark noise or when the light source 21 of a nearby lighting device 10 produces spark noise. When a detection signal is received after the masking time elapses, the signal controller 35 provides the light source controller 22 with an activation signal without performing masking. The reception of a detection signal when the signal controller 35 is not performing masking satisfies the condition for outputting the activation signal.

In this manner, the signal controller 35 provides the light source controller 22 with an activation signal when receiving a detection signal. However, the signal controller 35 distinguishes detection signals based on the elapsed time from when the lighting device 10 is supplied with AC power. In detail, if the signal controller 35 receives a detection signal when or after the specified time T1 elapses, the signal controller 35 determines that the detection signal was produced by spark noise from a nearby lighting device 10. When the signal controller 35 receives a detection signal before the specified time t1 elapses, the signal controller 35 determines that a moving body is present in the detection area of the lighting device 10.

If the signal controller 35 receives a detection signal when or after the specified time t1 elapses, the signal controller 35 performs masking during the specified time t2. By performing masking, when receiving a detecting signal before the specified time t2 elapses, the signal controller 35 ignores the detection signal and does not provide the light source controller 22 with an activation signal. Thus, the light source 21 is not activated by spark noise produced by a nearby light source 21.

The signal controller 35 also periodically performs masking.

Figure 4A:
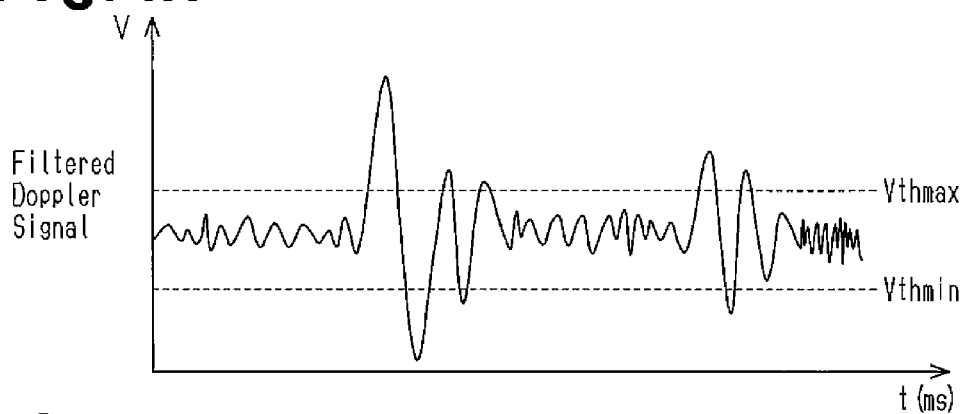
FIGS. 4A to 4C are timing charts illustrating conditions under which masking is periodically performed.
Figure 4B:

An example of a control for periodically performing masking will now be described with reference to FIGS. 4A to 4C.

After the lighting device 10 is supplied with power, when the first masking time (specified time t2) elapses, the signal controller 35 measures the elapsed time again. Then, referring to FIGS. 4A and 4B, after the specified time t1 elapses, the signal controller 35 may receive the detection signal again. In this case, the signal controller 35 performs masking again from when the detection signal received after the specified time t1 rises to when the specified time t2 elapses. When a detection signal is received before the specified time t1 elapses, the signal controller 35 does not perform masking.

Figure 4C:
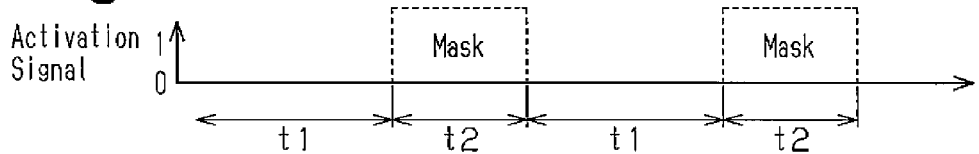

Accordingly, referring to FIG. 4C, when spike noise is produced again after the first masking ends, masking is performed again. For example, in FIG. 2, when a moving body is no longer detected in the detection area of the lighting device 10B, the stably activated light source 21 is deactivated. This produces spike noise. In this case, when the lighting device 10A is not activated, the lighting device 10A periodically performs masking. Thus, the lighting device 10A is not erroneously activated by spark noise produced when the lighting device 10B is deactivated.

The advantages of the present embodiment will now be described.

(1) When the intensity of a Doppler signal goes beyond a threshold, the light source controller 22 and the signal controller 35 restrict activation control of the light source 21 until the specified time t2 elapses even when receiving a detection signal. Thus, during the specified time t2, the light source controller 22 and the signal controller 35 do not perform activation control on the light source 21 even when a detection signal is received during the specified time t2. This reduces erroneous activation of the light source 21 that would be caused by the interference of radio waves at timing P1 when the light source 21 of a nearby lighting device 10 is activated.

(2) After the specified time t2 elapses, when the intensity of the Doppler signal exceeds a threshold, the activation control of the light source 21 is not restricted. Thus, the light source controller 22 and the signal controller 35 execute activation control on the light source 21. As a result, when receiving a detection signal after the specified time t2 elapses, the light source controller 22 and the signal controller 35 may activate the light source 21.

(3) When a Doppler signal having an intensity that goes beyond a threshold is not received over the specified time t1 or longer, the light source controller 22 and the signal controller 35 restrict the activation of the light source 21. When the intensity of a Doppler signal goes beyond a threshold regardless of whether or not spark noise is produced, the determination unit 34 generates a detection signal. The signal controller 35 distinguishes detection signals based on the time elapsed from when the lighting device 10 is supplied with AC power. This allows the signal controller 35 to determine whether or not to execute activation control on the light source 21 based on the time elapsed before receiving the detection signal.

(4) The signal controller 35 periodically performs masking. Thus, the light source 21 is not erroneously activated by spark noise produced when a light source 21 of a nearby lighting device 10 is deactivated.

(5) When a Doppler signal shifts out of the tolerable range at timings P1 and P2, the determination unit 34 provides the signal controller 35 with a detection signal. However, the signal controller 35 performs masking and ignores the received detection signal. Thus, the signal controller 35 does not provide the light source controller 22 with an activation signal. Consequently, the light source 21 is not erroneously activated by spark noise produced by a nearby light source 21.

(6) The specified time t2 is set to be longer than the period from timing P1 to timing P2. This allows for erroneous activation at the two timings to be avoided with a single masking.

A lighting device according to a second embodiment of the present invention will now be described with reference to FIGS. 5 to 8. Like or same reference numerals are given to those components that are the same as the corresponding components of the first embodiment. Such components will not be described in detail.

In the second embodiment, the signal controller 35 varies the masking time in accordance with whether or not the intensity of the Doppler signal is outside the tolerable range.

An example of a control executed when extending the masking time will first be described with reference to FIGS. 5A to 5C.

Figure 5A:
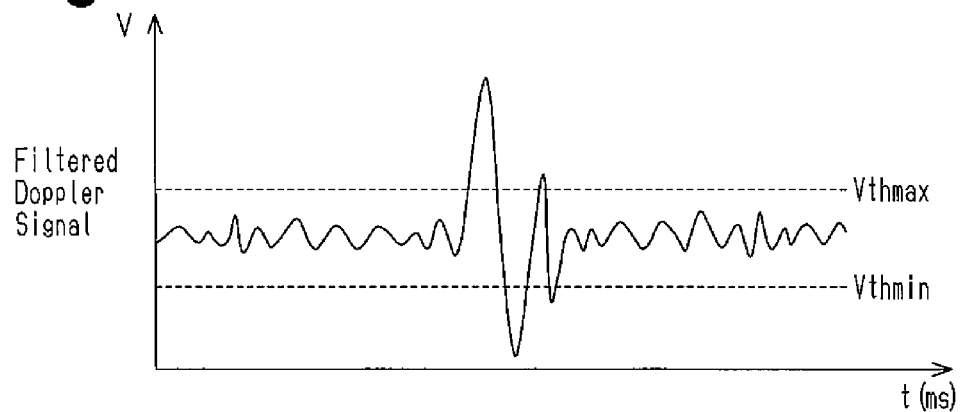
FIGS. 5A to 5C are timing charts for a lighting device in a second embodiment showing conditions under which masking is performed when the intensity of a Doppler signal successively goes beyond a maximum value and a minimum value of a tolerable range within a predetermined time.
Figure 5B:
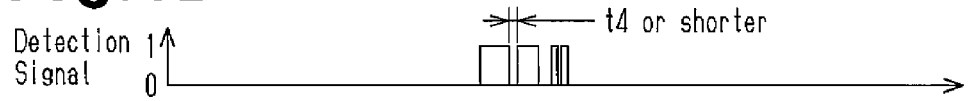
Figure 5C:
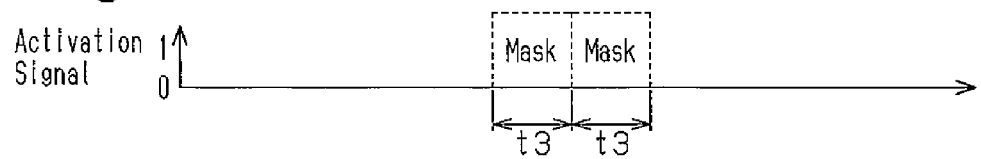

As shown in FIGS. 5A and 5B, after the lighting device 10 is supplied with power, when the signal controller 35 receives a detection signal for the first time, the signal controller 35 sets a masking time, which is from immediately after the detection signal rises, as time t3 and measures the elapsed time. Further, the signal controller 35 measures the input period of the first detection signal and the time until when a further detection signal is received again. When the signal controller 35 receives a detection signal having the logic value of 1, the signal controller 35 determines that the detection signal has been received. When the signal controller 35 receives a detection signal having the logic value of 0, the signal controller 35 determines that no detection signal has been received. Further, the signal controller 35 measures the time during which the logic value of 1 is received to recognize the input period of the detection signal.

After the lighting device 10 is supplied with power, the signal controller 35 determines whether or not the first detection signal has been input during a period of time t3 (in the second embodiment, 100 ms). Further, after receiving the first detection signal, the signal controller 35 determines whether or not a second detection signal has been received during a period of time t4 (in the second embodiment, 10 ms) from when the first detection signal is received. The signal controller 35 also determines whether or not the intensity of the Doppler signal triggering the output of the second detection signal goes beyond a threshold at the opposite side of the intensity of the Doppler signal triggering the output of the first detection signal.

When these determinations all obtain affirmative results, the signal controller 35 determines that the amplitude of the Doppler signal has successively gone beyond the maximum value and the minimum value of the tolerable range. After completing the masking the first detection signal, the signal controller 35 masks the second detection signal over a further period of time t3. Accordingly, as shown in FIG. 5C, even when a detection signal is provided from the determination unit 34 during an extended time t3, an activation signal is not generated since masking is performed.

When the three determinations described above are all affirmative results, the Doppler signal is presumed to have a very large amplitude. It takes more time for the amplitude to stabilize and converge within the tolerable range as the amplitude increases. The Doppler signal has a larger amplitude when the intensity of the Doppler signal goes beyond both of the maximum value and the minimum value than when the intensity goes beyond only one of the maximum value and the minimum value. Thus, a long masking time is set when the Doppler signal goes beyond both of the maximum value and the minimum value. More specifically, the intensity of a Doppler signal includes a highest peak value and a lowest peak value. When the highest peak value of the sensor signal goes beyond the maximum value of the tolerable range and the lowest peak value of the sensor signal also goes beyond the minimum value of the tolerable range, the signal controller 35 sets the masking time to be longer than the masking time when the highest peak value of the sensor signal goes beyond the maximum value of the tolerable range and longer than the masking time when the lowest peak value of the sensor signal goes beyond the minimum value of the tolerable range. Due to the extension of the masking time, the signal controller 35 does not erroneously activate the light source 21 based on spark noise produced by a light source 21 located proximal to the corresponding lighting device 10.

An example of a control that does not extend the masking time will now be described with reference to FIGS. 6A to 6C.

Figure 6A:
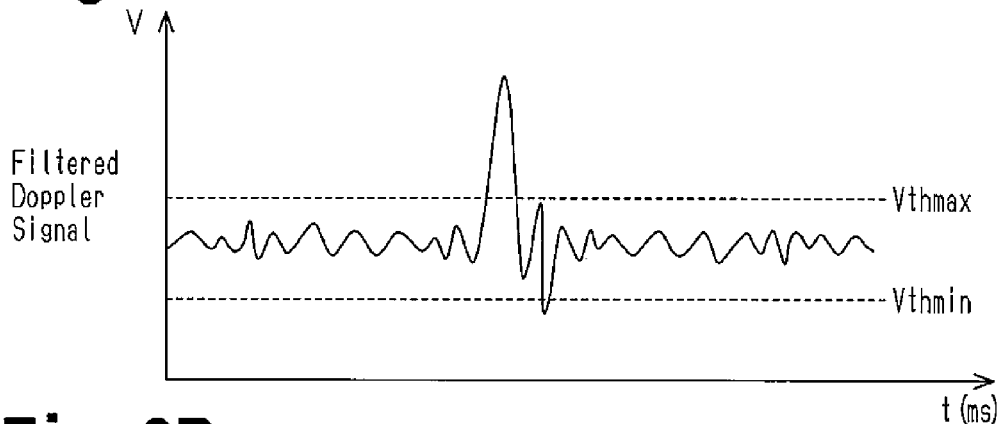
FIGS. 6A to 6C are timing charts for the lighting device of the second embodiment showing conditions under which masking is performed when the intensity of a Doppler signal successively goes beyond a maximum value and a minimum value of a tolerable range over a period longer than the predetermined time.
Figure 6B:
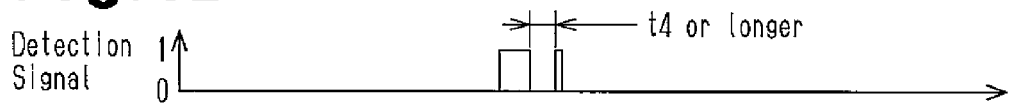
Figure 6C:
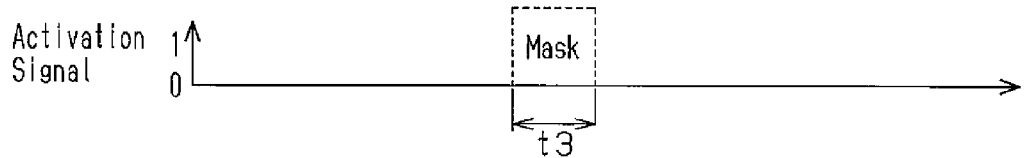

As shown in FIGS. 6A and 6B, after the lighting device 10 is supplied with power, when the signal controller 35 receives a detection signal for the first time, the signal controller 35 sets time t3 as a masking time, which is from immediately after the detection signal rises, and measures the elapsed time. Here, the signal controller 35 determines that the period during which the first detection signal has been input is no longer than time t3. The signal controller 35 also determines that the intensity of the Doppler signal triggering the output of a second detection signal has gone beyond a threshold at the opposite side of the intensity of the Doppler signal triggering the output of the first detection signal. Further, the signal controller 35 determines that the second detection signal has been received after at least time t4 elapsed from when the first detection signal was input.

In this case, the signal controller 35 determines that the condition for extending the masking time has not been satisfied. When a determination signal is received for the second time after at least time t4 elapses, the spike noise has a smaller reverberation than the example of FIG. 5. Thus, as shown in FIG. 6C, the signal controller 35 does not extend the masking time after time t3 elapses.

A further example of a control that does not extend the masking time will now be described with reference to FIGS. 7A to 7C.

Figure 7A:
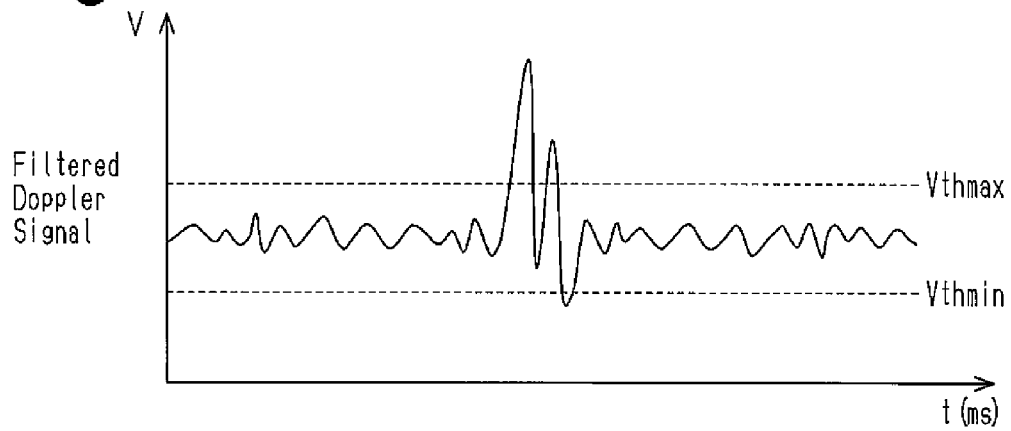
FIGS. 7A to 7C are timing charts for the lighting device of the second embodiment showing conditions under which masking is performed when the intensity of a Doppler signal does not go beyond one of the thresholds.
Figure 7B:
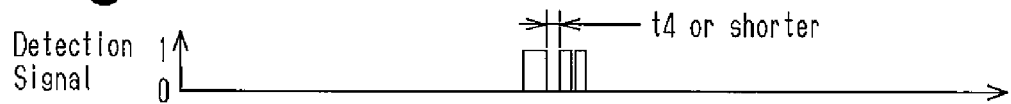
Figure 7C:
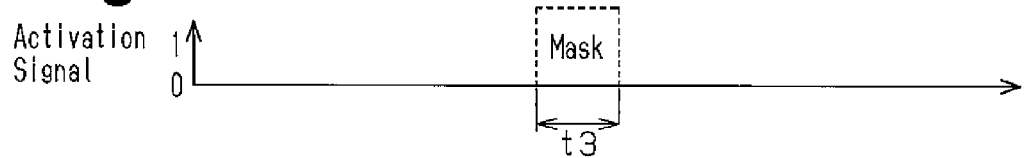

As shown in FIGS. 7A and 7B, after the lighting device 10 is supplied with power, when the signal controller 35 receives a detection signal for the first time, the signal controller 35 sets time t3 as a masking time, which is from immediately after the detection signal rises, and measures the elapsed time. Here, the signal controller 35 determines that the period during which the first detection signal has been input is time t3 or shorter. The signal controller 35 also determines that a detection signal has been received for a second time within a period of time t4 or shorter after the input of the first detection signal. The signal controller 35 also determines that the intensity of the Doppler signal triggering the output of the second detection signal has gone beyond a threshold at the same side of the intensity of the Doppler signal triggering the output of the first detection signal.

In this case, the signal controller 35 determines that the condition for extending the masking time has not been satisfied. When the intensity of the Doppler signal triggers the output of the first and second detection signals go beyond the threshold at the same side, the spike noise has a smaller reverberation than the example of FIG. 5. Thus, as shown in FIG. 7C, the signal controller 35 does not extend the masking time after time t3 elapses.

Another example of a control that does not extend the masking time will now be described with reference to FIGS. 8A to 8C.

Figure 8A:
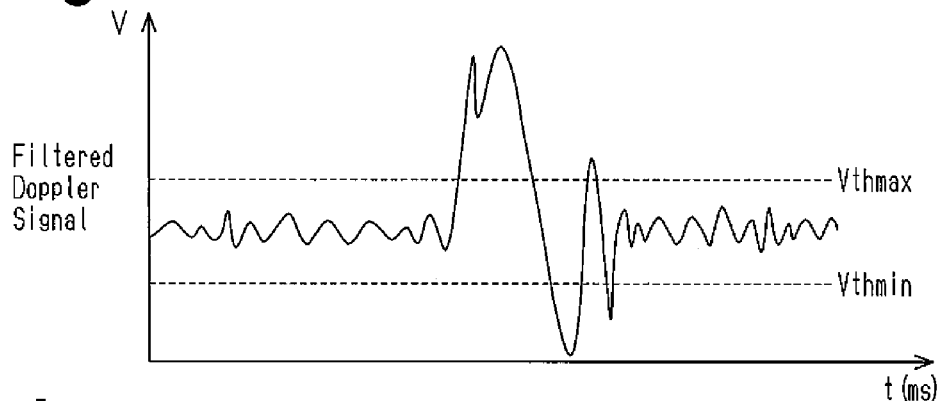
FIGS. 8A to 8C are timing charts for the lighting device of the second embodiment showing conditions under which masking is performed when a first peak of a Doppler signal is output over a time period that is longer than a specified time.
Figure 8B:
Figure 8C:
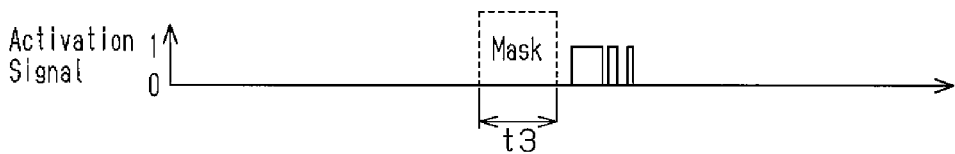

As shown in FIGS. 8A and 8B, after the lighting device 10 is supplied with power, when the signal controller 35 receives a detection signal for the first time, the signal controller 35 sets time t3 as a masking time, which is from immediately after the detection signal rises, and measures the elapsed time. Here, the signal controller 35 determines that a detection signal has been received for a second time within a period of time t4 or shorter after the input of the first detection signal. The signal controller 35 also determines that the intensity of the Doppler signal triggering the output of the second detection signal has gone beyond a threshold at the opposite side of the intensity of the Doppler signal triggering the output of the first detection signal. However, the signal controller 35 determines that the period during which the first detection signal has been input is longer than time t3.

In this case, the signal controller 35 determines that the condition for extending the masking time has not been satisfied. When the first detection signal is input for a long period of time, the spike noise has a smaller reverberation than the example of FIG. 5. Thus, as shown in FIG. 8C, the signal controller 35 does not extend the masking time after time t3 elapses. When receiving a detection signal after time t3 elapses, the signal controller 35 provides the light source controller 22 with an activation signal.

In addition to advantages (1) to (6) of the first embodiment, the second embodiment has the following advantage.

(7) Within a period of time t4 or shorter after the input of a first detection signal, when the intensity of a Doppler signal triggering the output of a second detection signal goes beyond a threshold at the opposite side of the intensity of the Doppler signal triggering the output of the first detection signal, the Doppler signal has a large amplitude. As the amplitude increases, it takes more time for the amplitude to stabilize and converge in the tolerable range. In such a case, the masking time is extended. Thus, the light source 21 is not erroneously activated by spark noise from a light source 21 located proximal to the corresponding lighting device 10 before the amplitude is converged within the tolerable range.

A lighting device according to a third embodiment of the present invention will now be described with reference to FIG. 9. Like or same reference numerals are given to those components that are the same as the corresponding components of the first and second embodiments. Such components will not be described in detail.

In the third embodiment, in addition to determining whether or not the intensity of the Doppler signal is outside the tolerable range, the signal controller 35 varies the masking time in accordance with the intensity of the Doppler signal.

More specifically, the signal controller 35 sets multiple maximum values and minimum values for the tolerable range. More specifically, the signal controller 35 sets a second maximum value Vthmax2, which is greater than the maximum value Vthmax, and a third maximum value Vthmax3, which is greater than the second maximum value Vthmax2. Further, the signal controller 35 sets a second minimum value Vthmin2, which is less than the minimum value Vthmin, and a third minimum value Vthmin3, which is less than the second minimum value Vthmin2.

In the description hereafter, the maximum value Vthmax and the minimum value Vthmin form a first tolerable range Vth. The second maximum value Vthmax2 and the second minimum value Vthmin2 form a second tolerable range Vth2. The third maximum value Vthmax3 and the third minimum value Vthmin3 form a third tolerable range Vth3.

After the lighting device 10 is supplied with power, when a detection signal is being input for the first time, the signal controller 35 determines whether or not the intensity of a Doppler signal triggering the first detection signal is outside the second tolerable range Vth2 and the third tolerable range Vth3.

When the intensity of the Doppler signal is outside the first tolerable range Vth but inside the second tolerable range Vth2, the signal controller 35 sets time t3 (in the third embodiment, 100 ms) as the masking time. When the intensity of the Doppler signal is outside the second tolerable range Vth2 but inside the third tolerable range Vth3, the signal controller 35 sets a time obtained by adding time t5 (in the third embodiment, 50 ms) to time t3 as the masking time. When the intensity of the Doppler signal is outside the third tolerable range Vth3, the signal controller 35 sets a time obtained by adding time t3 to a further time t3 as the masking time. In this manner, the present embodiment sets a longer masking time for a higher intensity.

When a Doppler signal has a high signal intensity, the Doppler signal has a large amplitude. As the amplitude increases, it takes more time for the amplitude to stabilize and converge in the first tolerable range Vth. In such a case, the masking time is extended in accordance with the intensity of the Doppler signal. As a result, the light source 21 is not activated by spark noise produced by a light source 21 located proximal to the corresponding lighting device 10.

An example of a control executed by the lighting device 10 of the third embodiment will now be described with reference to FIGS. 9A to 9C.

Figure 9A:
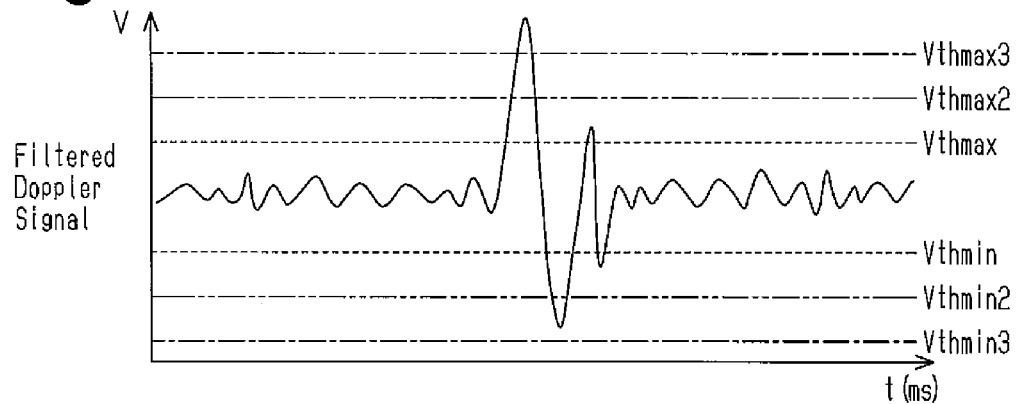
FIGS. 9A to 9C are timing charts for a lighting device of a third embodiment showing conditions under which a masking time is changed in accordance with the signal intensity of a Doppler signal.
Figure 9B:
Figure 9C:
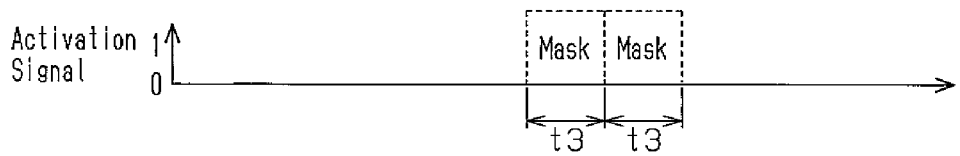

As shown in FIGS. 9A and 9B, after the lighting device 10 is supplied with power, when receiving a detection signal for the first time, the signal controller 35 identifies the tolerable ranges (Vth, Vth2, and Vth3) that the intensity of the Doppler signal triggering the output of the detection signal is outside of.

In FIG. 9A, the intensity of the Doppler signal is outside of the third tolerable range Vth3. Thus, as shown in FIG. 9C, the signal controller 35 sets the masking time as the time obtained by adding time t3 to time t3.

In addition to advantages (1) to (6) of the first embodiment, the third embodiment has the following advantage.

(8) The length of the masking time is varied in accordance with the intensity of the Doppler signal. This allows the masking time to be set in accordance with the intensity of the Doppler signal. Thus, even when spark noise is produced by a light source 21 located proximal to the corresponding lighting device 10 and the masking time is short, erroneous activation of the light source 21 does not occur. This allows for lighting control to be executed with further accuracy.

A lighting device according to a fourth embodiment of the present invention will now be described with reference to FIGS. 10 and 11. Like or same reference numerals are given to those components that are the same as the corresponding components of the first to third embodiments. Such components will not be described in detail.

In the fourth embodiment, in addition to determining whether or not the intensity of the Doppler signal is outside the tolerable range, the signal controller 35 varies the masking time in accordance with the intensity of the Doppler signal.

More specifically, whenever the intensity of the Doppler signal is outside the first tolerable range Vth but inside a second tolerable range Vth2, time t5 (in the fourth embodiment, 100 ms) is added to the masking time. Whenever the intensity of the Doppler signal is outside the second tolerable range Vth2 but inside the third tolerable range Vth3, time t3 (in the fourth embodiment, 100 ms) is added to the masking time. Whenever the intensity of the Doppler signal is outside the third tolerable range Vth3, time t6 (in the fourth embodiment, 150 ms) is added to the masking time.

For example, the signal controller 35 may determine that the intensity of a Doppler signal triggering the output of a detection signal for the first time is outside the first tolerable range Vth but inside the second tolerable range Vth2. Then, the signal controller 35 may determine that the intensity of the Doppler signal triggering the output of a detection signal for the second time is inside the first tolerable range Vth although the intensity goes beyond a threshold at the opposite side of the intensity of the Doppler signal triggering the output of the first detection signal.

In this case, the signal controller 35 sets the masking time based on the table shown in FIG. 10. Specifically, when the first detection signal is generated, the signal controller 35 sets the masking time to time t5. After time t5 elapses, the intensity of the Doppler signal that triggered the second detection signal is inside the first tolerable range Vth. Thus, the signal controller 35 does not extend the masking time. As a result, the total masking time is time t5.

An example of a control executed by the lighting device 10 of the third embodiment will now be described with reference to FIGS. 11A to 11C.

As shown in FIGS. 11A and 11B, after the lighting device 10 is supplied with power, when receiving a detection signal for the first time, the signal controller 35 determines the tolerable range that the intensity of the Doppler signal triggering the output of the detection signal goes outside of.

In FIG. 11A, the intensity of the Doppler signal is outside the third tolerable range. Thus, as shown in FIG. 11C, the signal controller 35 sets time t6 as the masking time. The signal controller 35 sets the masking time immediately after the first detection signal rises and then measures the elapsed time.

Further, the signal controller 35 measures the time of the period during which the first detection signal is input. The signal controller 35 also measures the time until a detection signal is received again. Here, the signal controller 35 determines that the first detection signal is input over a period that is shorter than or equal to time t5. The signal controller 35 also determines that the second detection signal is input within time t4 after the input of the first detection signal. Further, the signal controller 35 determines that the intensity of the Doppler signal triggering the output of the second detection signal goes beyond a threshold opposite to the intensity of the Doppler signal that triggered the first detection signal.

In this case, the signal controller 35 determines the tolerable ranges Vth, Vth2, and Vth3 that the intensity of the Doppler signal triggering the output of the second detection signal is out side of.

In FIG. 11A, the intensity of the Doppler signal triggering the second detection signal is outside the second tolerable range Vth2 but inside the third tolerable range. Thus, as shown in FIG. 11C, the signal controller 35 extends the masking time by time t3 after time t6 elapses.

In this manner, in the fourth embodiment, as the intensity of successive peaks in the Doppler signal increases, a longer masking time is set. Thus, even when the Doppler signal triggers the output of the first and second detection signals at different amplitudes, the masking time is set in accordance with each signal intensity.

In addition to advantages (1) to (6) of the first embodiment, the fourth embodiment has the following advantage.

(9) The Doppler signal does not necessarily have the same amplitude at the maximum value side and the minimum value side. Regardless of the amplitude of the Doppler signal triggering the output of the first and second detection signals, the length of the masking time is varied in accordance with the level of the tolerable range that the intensity of the Doppler signal goes beyond. This allows for activation control to be executed with further accuracy.

The first to fourth embodiments may be modified as described below.

In the second embodiment, when the signal intensity of a Doppler signal successively goes beyond the maximum and minimum thresholds, after a masking time, which is set immediately after a detection signal rises for the first time, elapses, the masking time is extended. Instead, when a detection signal is received for the second time, the first masking time may be reset, and the new masking time may be measured. In this case, the difference is small between the masking time and the input time of a detection signal based on a spark noise. Thus, when a detection signal is received after the masking time ends, the light source 21 may be activated at an early stage.

In the first to fourth embodiments, masking may be periodically performed to reduce erroneous activation of the light source 21 even when vibration produced in the detection area of the sensor 31 is detected as spike noise.

In the first to fourth embodiments, the masking time may be varied in accordance with the time from when the lighting device 10 is supplied with power to when the light source 21 is activated and the time from when the light source 21 is activated to when the activation of the light source 21 stabilizes.

In the first to fourth embodiments, the light source controller 22 may be arranged along a power supply line leading to the light source 21. In this case, instead of generating an activation signal, the light source 21 may be activated and deactivated by starting and stopping the supply of power to the light source 21.

In the first to fourth embodiments, as long as the sensor 31 is an active type sensor, the sensor 31 is not limited to a millimeter wave sensor that uses millimeter waves. For example, the sensor 31 may be a microwave sensor that uses microwaves or a distance measurement sensor that uses ultrasonic waves as detection waves to detect the distance to an object in a detection area.

In the first to fourth embodiments, the frequency band of a detection signal used to detect a human body does not have to be 0 to 500 Hz. That is, the frequency band may be changed based on the moving speed of a human body, the frequency of radio waves transmitted from the sensor 31, the speed of light, and the angle of a moving direction of an object relative to a straight line connecting an upper end of the object and the sensor 31.

In the first to fourth embodiments, the signal controller 35 provides the light source controller 22 with an activation signal. However, when the light source controller 22 recognizes that masking is being performed, the output of the activation signal may be restricted so that the light source 21 is not activated.

In the first to fourth embodiments, when arranging a plurality of lighting devices in the room K, only one needs to be the lighting device 10. In this case, even when the lighting device 10 receives a Doppler signal based on spark noise produced by the light source of another lighting device, masking may be executed so that the light source 21 is not erroneously activated.

In the first to fourth embodiments, the specified time t1 is the minimum time required for the light source 21 to activate after the lighting device 10 is supplied with power. In this case, the specified time t1 may be the minimum time required for the light source 21 to activate after the light source 21 is supplied with power or the minimum time required for the light source 21 to activate after the light source controller 22 is supplied with the activation signal.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A sensor device for reducing erroneous activation of a light source comprising:
    a sensor that transmits radio waves of a predetermined frequency and receives reflected waves of the transmitted radio waves, wherein the sensor device detects presence of a moving body based on a difference between a frequency of the transmitted radio waves and a frequency of the reflected waves to activate the light source in accordance with the detection;
    a processor that generates a sensor signal indicating the detection of the sensor;
    a determination unit that determines whether or not the sensor signal has an intensity that is greater than a predetermined threshold; and
    a controller that controls activation of the light source when it is determined that the intensity of the sensor signal is greater than the threshold,
    wherein the controller restricts activation of the light source when it is determined that the intensity of the sensor signal is greater than the threshold until a first specified time elapses from the determination,
    wherein when it is determined that the intensity of the sensor signal is less than or equal to the threshold in a predetermined second specified time and it is determined that the intensity of the sensor signal is greater than the threshold after the second specified time elapses, the controller restricts activation of the light source from when it is determined that the intensity of the sensor signal is greater than the threshold to when the first specified time elapses.

2. The sensor device according to claim 1, wherein the controller varies a length of the first specified time in accordance with the intensity of the sensor signal.

3. The sensor device according to claim 2, wherein
    the threshold value is one of a maximum value and a minimum value,
    the intensity of the sensor signal includes a highest peak value and a lowest peak value, and
    the controller sets the first specified time for when the highest peak value of the intensity of the sensor signal is greater than the maximum value and the lowest peak value of the intensity of the sensor signal is less than the lowest peak value to be longer than the first specified time for when the highest peak value of the intensity of the sensor signal is greater than the maximum value and the lowest peak value of the intensity of the sensor signal is greater than the lowest peak value or the first specified time for when the highest peak value of the intensity of the sensor signal is less than the maximum value and the lowest peak value of the intensity of the sensor signal is less than the lowest peak value.

4. The sensor device according to claim 1, wherein
    the threshold is one of a plurality of thresholds, and
    the controller varies a length of the first specified time in accordance with one of the thresholds that correspond to the intensity of the sensor signal.

5. The sensor device according to claim 1, wherein the first specified time is set to be longer than a period from when the light source is activated to when the activated light source stabilizes.

6. The sensor device according to claim 1, wherein the second specified time is set as a minimum time required for the light source to be activated from when the sensor device is supplied with power.

* * * * *